(12) United States Patent
Hatab

(10) Patent No.: US 12,272,346 B2
(45) Date of Patent: Apr. 8, 2025

(54) SYSTEM AND METHOD FOR MOTION SICKNESS REDUCTION IN MOVING ENVIRONMENTS

(71) Applicant: HARMAN INTERNATIONAL INDUSTRIES, INCORPORATED, Stamford, CT (US)

(72) Inventor: Ziad Ramez Hatab, Bloomfield Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 132 days.

(21) Appl. No.: 18/254,194

(22) PCT Filed: Nov. 27, 2020

(86) PCT No.: PCT/US2020/062482
§ 371 (c)(1),
(2) Date: May 24, 2023

(87) PCT Pub. No.: WO2022/115107
PCT Pub. Date: Jun. 2, 2022

(65) Prior Publication Data
US 2023/0410781 A1 Dec. 21, 2023

(51) Int. Cl.
*G10K 11/178* (2006.01)
*G08B 6/00* (2006.01)

(52) U.S. Cl.
CPC .......... *G10K 11/17823* (2018.01); *G08B 6/00* (2013.01); *G10K 11/17825* (2018.01);
(Continued)

(58) Field of Classification Search
CPC ....... G10K 11/17823; G10K 11/17825; G10K 11/17873; G10K 2210/128;
(Continued)

(56) References Cited

U.S. PATENT DOCUMENTS

2023/0280830 A1* 9/2023 Fainstain ............... A61B 5/486
345/156

FOREIGN PATENT DOCUMENTS

JP   H04129847 A   4/1992
JP   H07186803 A   7/1995
(Continued)

OTHER PUBLICATIONS

International Search Report dated Jul. 22, 2021 for PCT Appn. No. PCT/US2020/062482 filed Nov. 27, 2020, 46 pgs.
(Continued)

*Primary Examiner* — Curtis A Kuntz
*Assistant Examiner* — James E Munion
(74) *Attorney, Agent, or Firm* — Brooks Kushman P.C.

(57) ABSTRACT

In one embodiment, a computer-program product embodied in a non-transitory computer readable medium that is programmed for performing active vibration cancellation (AVC) in a moving vessel is provided. The computer-program product includes instructions to receive a first signal indicative of vibrations that are exhibited on at least one passenger in a cabin of the moving vessel and to determine a resonant frequency of the vibrations that are exhibited on the at least one passenger based on the first signal. The computer-program product further includes instructions to generate a first anti-wave signal based on the resonant frequency and to drive at least one haptic actuator that is positioned proximate to the at least one passenger in the cabin with the first anti-wave signal to minimize motion sickness for the at least one passenger caused by the vibrations that are exhibited on the at least one passenger in the vessel.

20 Claims, 6 Drawing Sheets

(52) U.S. Cl.
CPC .. G10K 11/17873 (2018.01); *G10K 2210/128* (2013.01); *G10K 2210/1291* (2013.01); *G10K 2210/30231* (2013.01); *G10K 2210/3026* (2013.01); *G10K 2210/3027* (2013.01); *G10K 2210/3044* (2013.01); *G10K 2210/3226* (2013.01); *G10K 2210/3229* (2013.01)

(58) Field of Classification Search
CPC . G10K 2210/1291; G10K 2210/30231; G10K 2210/3026; G10K 2210/3027; G10K 2210/3044; G10K 2210/3226; G10K 2210/3229; G08B 6/00
See application file for complete search history.

(56) References Cited

FOREIGN PATENT DOCUMENTS

| | | | |
|---|---|---|---|
| JP | 2020083241 A | | 6/2020 |
| KR | 20180033139 A | * | 4/2018 |

OTHER PUBLICATIONS

International Preliminary Report on Patentability dated Jun. 8, 2023 for PCT Appn. No. PCT/US2020/062482 filed Nov. 27, 2020, 8 pgs.

* cited by examiner

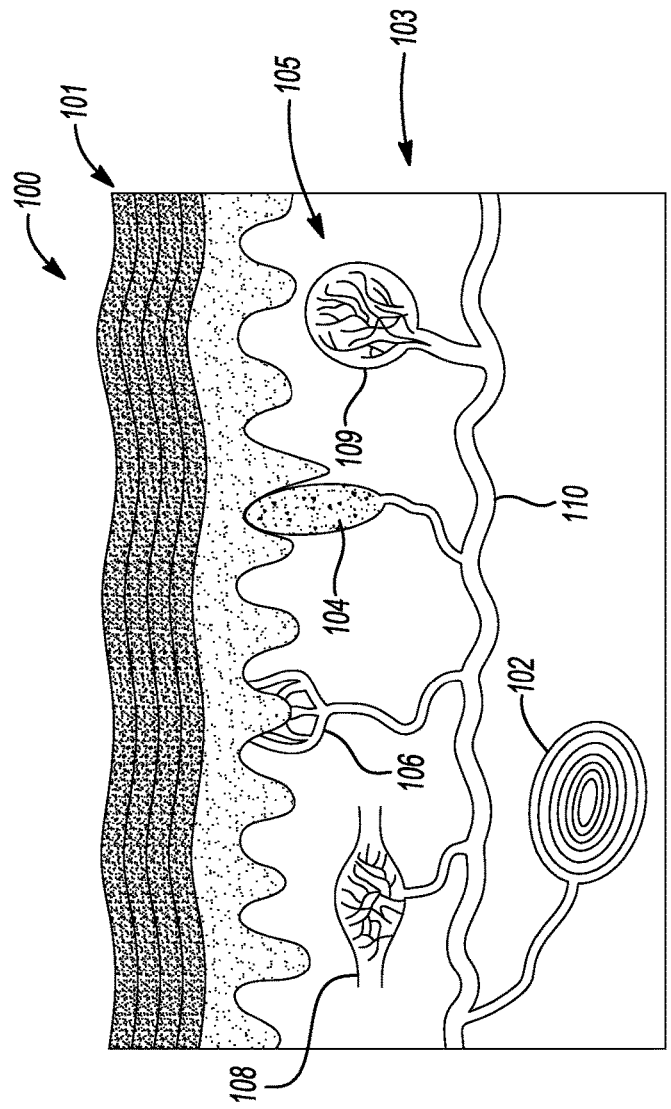
_Fig-1_
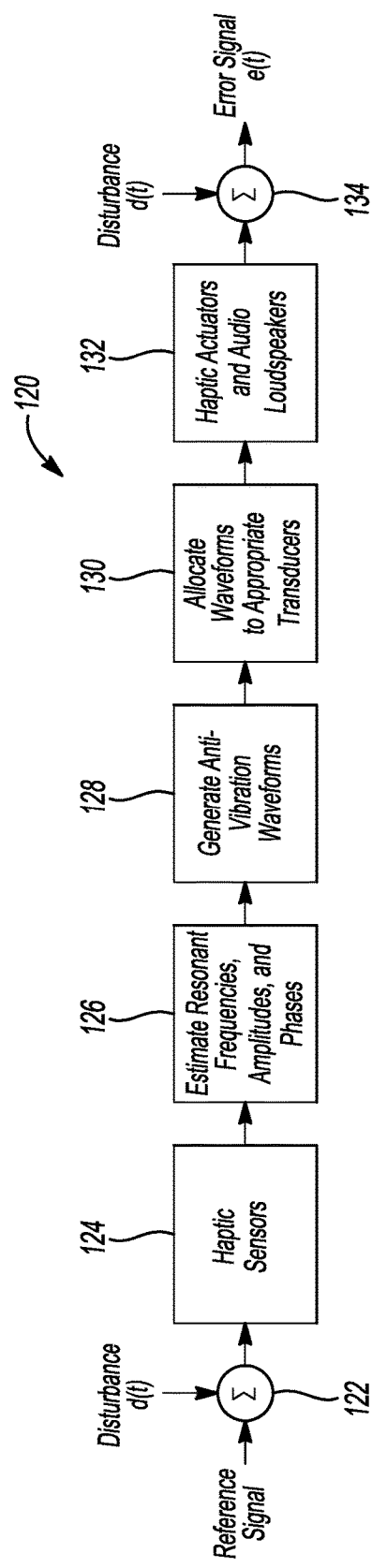
_Fig-2_

SYSTEM AND METHOD FOR MOTION SICKNESS REDUCTION IN MOVING ENVIRONMENTS

CROSS-REFERENCE TO RELATED APPLICATION

This application is the U.S. National Phase of PCT Appln. No. PCT/US2020/062482, filed on Nov. 27, 2020, the disclosure of which is incorporated in its entirety by reference herein.

TECHNICAL FIELD

Aspects disclosed herein generally relate to a system and method for motion sickness reduction in moving environments. In particular, aspects disclosed herein generally provide, but not limited to, providing haptic feedback to reduce motion sickness in a moving vessel. These aspects and other will be discussed in more detail herein.

BACKGROUND

Motion sickness is also referred to as travel sickness, seasickness, airsickness, carsickness, simulation sickness, spatial disorientation, space motion sickness, or space adaptation syndrome. Symptoms of motion sickness commonly include nausea, vomiting, cold sweat, headache, sleepiness, yawning, loss of appetite, and increased salivation. Complications may rarely include dehydration, electrolyte problems, or a lower esophageal tear.

Motion sickness occurs when there are mismatches between actual versus expected sensory inputs. In other words, conflicting sensory signals can cause motion sickness, which is also referred to as sensory conflict theory (SCT). SCT refers to a discontinuity in states between either visual, kinesthetic and somatosensory, or vestibular systems. In particular, humans maintain balance with the help of signals sent by many parts of the body, for example, eyes and inner ears. Other sensory receptors in legs, feet, hands, and fingers let the nervous system know what parts of the body are touching the ground.

An example of motion sickness caused by motion that is felt but not seen, as in terrestrial motion sickness, is someone looking at a stationary object within a vehicle, such as a magazine; their eyes inform the brain that what they are viewing is not moving. However, other kinesthetic or vestibular sensors contradict this by sensing the motion of the vehicle. Another example comes into play with passengers on an airplane and in which turbulence cannot be seen, but passengers can feel the turbulence. The resulting confusion can cause nausea or even vomiting.

Common motion sickness treatments fall under the following categories: (i) behavioral measures such as holding the head still and lying on the back, focusing on the horizon, listening to music, mindful breathing, being the driver, and not reading while moving, (ii) medication such as over-the-counter pills or patches, (iii) alternative medicine such as acupuncture, and (iv) cognitive therapy and biofeedback such as monitoring various body functions.

However, all these existing treatments only address the symptoms of motion sickness instead of the causes that attribute to the motion sickness. Thus, such treatments fail to solve the inherent physiological issues of sensory conflict. Moreover, by focusing only on the symptoms, these existing treatments tend to alter travelers' biological states, for example, by making travelers' biological states sleepy, groggy, etc. Thus, the treatments fail to provide travelers with a sense of physical normalcy to continue with activities the travelers would otherwise engage in within stationary environments such as a reading, talking, moving their heads, etc.

Aspects disclosed herein may address the shortcomings of existing treatments by identifying and minimizing sensory conflict affecting travelers in real-time without restricting traveler's activities while in a moving cabin.

SUMMARY

In at least one embodiment, an active vibration cancellation (AVC) system is provided. The AVC system includes at least one haptic sensing assembly and at least one controller. The at least one haptic sensing assembly is positioned in a cabin of a moving vessel and is configured to transmit a first signal indicative of vibrations that are exhibited on at least one passenger in the cabin. The at least one controller is programmed to transmit a first signal indicative of vibrations that are exhibited on at least one passenger in the cabin and to determine a resonant frequency of the vibrations that are exhibited on the at least one passenger in response to the first signal. The at least one controller is further programmed to determine that the resonant frequency is less than a first predetermined value and to generate a first anti-wave signal in response to the resonant frequency being less than the first predetermined value. The at least one controller is further programmed to drive at least one haptic actuator that is positioned proximate to the at least one passenger in the cabin with the first anti-wave signal to minimize motion sickness for the at least one passenger caused by the vibrations that are exhibited on the at least one passenger in the vessel.

In at least another embodiment, a computer-program product embodied in a non-transitory computer readable medium that is programmed for performing active vibration cancellation (AVC) in a moving vessel is provided. The computer-program product includes instructions to receive a first signal indicative of vibrations that are exhibited on at least one passenger in a cabin of the moving vessel and to determine a resonant frequency of the vibrations that are exhibited on the at least one passenger based on the first signal. The computer-program product further includes instructions to generate a first anti-wave signal based on the resonant frequency and to drive at least one haptic actuator that is positioned proximate to the at least one passenger in the cabin with the first anti-wave signal to minimize motion sickness for the at least one passenger caused by the vibrations that are exhibited on the at least one passenger in the vessel.

In at least another embodiment, a method for performing active vibration cancellation (AVC) in a moving vessel is provided. The method includes receiving a first signal indicative of vibrations that are exhibited on at least one passenger in a cabin of the moving vessel and determining a resonant frequency of the vibrations that are exhibited on the at least one passenger based on the first signal. The method further includes generating a first anti-wave signal based on the resonant frequency and driving at least one haptic actuator that is positioned proximate to the at least one passenger in the cabin with the first anti-wave signal to minimize motion sickness for the at least one passenger caused by the vibrations that are exhibited on the at least one passenger in the vessel.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 1 generally depicts primary tactile mechanoreceptors in skin of a human being;

FIG. 2 generally depicts an active vibration cancellation (AVC) system that utilizes haptic feedback in accordance to one embodiment;

DETAILED DESCRIPTION

Figure 3:
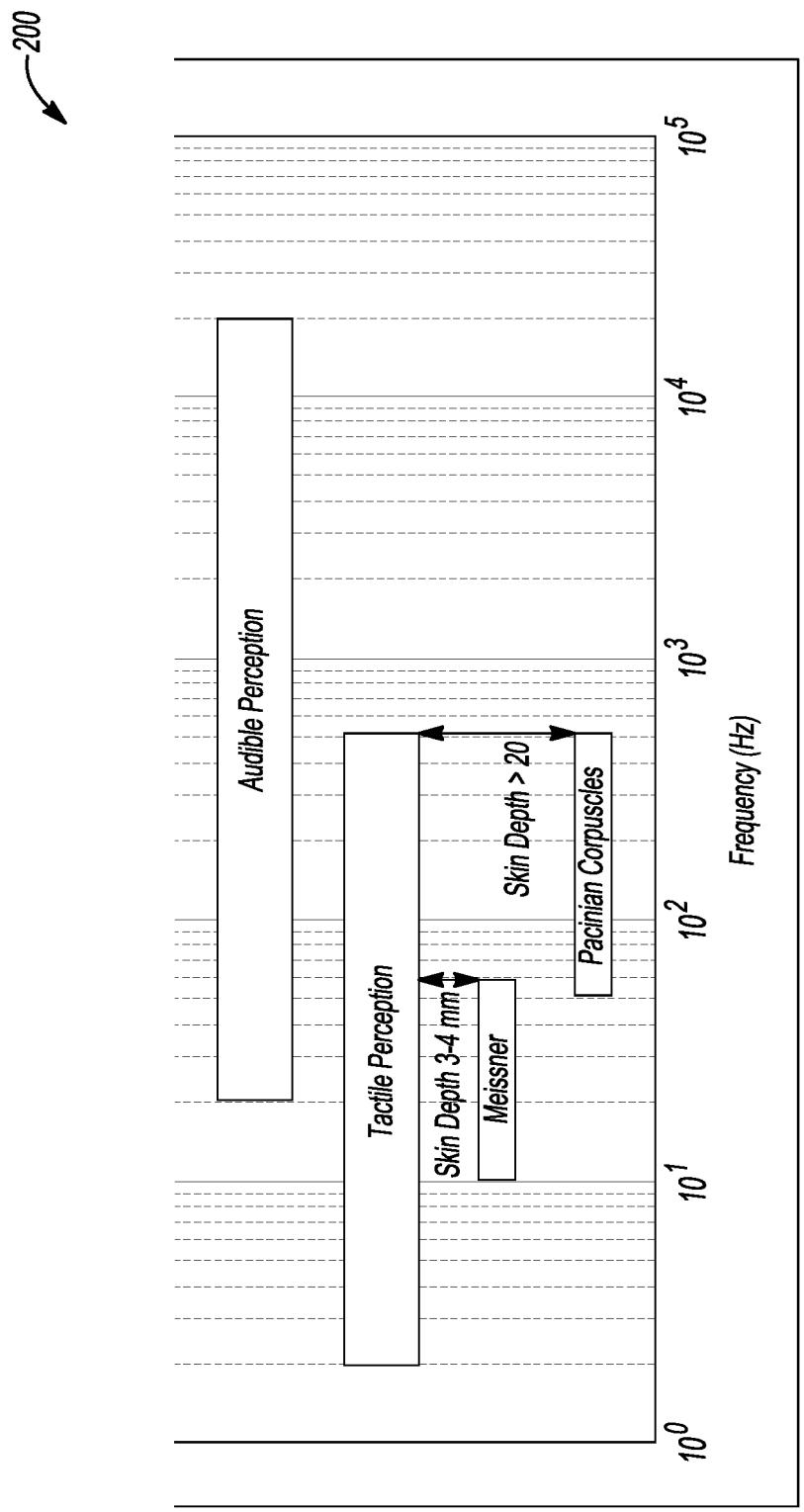
FIG. 3 depicts frequency response ranges for human tactile and audible perceptions.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program product that is embodied in a non-transitory computer readable medium that is programmed to perform any number of the functions as disclosed. Further, the controller(s) as provided herein includes a housing and the various number of microprocessors, integrated circuits, and memory devices (e.g., FLASH, random access memory (RAM), read only memory (ROM), electrically programmable read only memory (EPROM), electrically erasable programmable read only memory (EEPROM)) positioned within the housing. The controller(s) as disclosed also includes hardware-based inputs and outputs for receiving and transmitting data, respectively from and to other hardware-based devices as discussed herein.

It is also recognized that directional terms that may be noted herein (e.g., "upper", "lower", "inner", "outer", "top", "bottom", etc.) simply refer to the orientation of various components of a loudspeaker assembly as illustrated in the accompanying figures. Such terms are provided for context and understanding of the embodiments disclosed herein. Multiple embodiments are disclosed below and it is herein understood that similar reference numerals may be disclosed in connection with the different embodiments and that such reference numerals will not be described for every occurrence of these reference numerals in the embodiments for purposes of brevity.

FIG. 1 generally depicts primary tactile mechanoreceptors in skin 100 of a human being. In general, cutaneous sensors on the human skin 100 are responsible for transducing feelings of warmth, cold, pain, itch, sound, and mechanical energy to the brain via a series of free nerve endings and specialized nerve endings. The skin 100 in defined by an epidermis 101 and a dermis 103. In particular, mechanoreceptors 105 are sensory neurons that respond to mechanical pressure or distortion. There are four main types of mechanoreceptors 105 in glabrous or hairless skin 100. For example, the mechanoreceptors 105 include Lamellar or Pacinian corpuscles 102, Tactile or Meissner's corpuscles 104, Merkel's disks 106, Bulbous or Ruffini endings 108, and Krause end bulb 109 that are positioned in the dermis 103. A nerve 110 is connected to the Pacinian corpuscles 102, the Meissner's corpuscles 104, the Merkel's disks 106, the Ruffini endings 108, and the Krause end bulb 109. The Pacinian corpuscles 102 and the Meissner's corpuscles 104 are encapsulated mechanoreceptors while the Merkel's disks 106 and the Ruffini endings 108 are not encapsulated. In general, the encapsulation or non-encapsulation aspects may have implications for the receptor sensitivity to continuous and steady state deformations.

Pacinian corpuscles 102 may be pressure receptors that are located relatively deep under the skin 100 (e.g., larger than 20 mm), also within in various internal organs. In the skin 100, the Pacinian corpuscles 102 detect rapid vibratory pressure and touch between 50 Hz to 500 Hz with an optimal sensitivity at 250 Hz. The Meissner's corpuscles 104 are also pressure receptors located closer to the skin 100 (e.g., 3 to 4 mm) and react to moderate vibrations and light touch between 10 to 60 Hz.

The concentration of cutaneous sensors varies a great deal over the human body. The concentration in the thumb, forefingers, feet, toes, and lips is quite high, while on the torso the concentration of cutaneous sensors is relatively low. The entire body surface can be mapped through neural connections to the somatosensory cortex, which lies on the top surface of the brain, running from ear to ear. The result of the mapping is a sensory cortical homunculus, which is a distorted representation of the human body based on a neurological map of the areas and proportions of the human brain dedicated to processing sensory functions for different parts of the body. In general, the various body parts such as the lips, hands, fingers, thumbs, feet and toes include a larger concentration of cutaneous sensors.

Aspects disclosed herein provides for a system and a method that measures cabin vibrations in close proximity to a traveler's body parts with a large concentration of cutaneous sensors, in particular hands and feet, and subsequently generates anti-vibration waveforms, for example, waveforms with similar frequencies and amplitudes similar to vibratory waveforms but with inverted phases. The anti-vibration waveforms are then applied to haptic actuators in close contact to travelers' hands and feet, for example, in order to minimize the feelings of motion at the mechanoreceptors and hence to minimize sensory conflicts. Depending on the vibratory resonant frequencies, anti-vibration waveforms may also be applied to audio loudspeakers, thus further reducing sensory conflicts between the auditory, visual, and kinesthetic sensory systems and further minimizing feelings of motion sickness.

FIG. 2 generally depicts an active vibration cancellation (AVC) system 120 that utilizes haptic feedback in accordance to one embodiment. The AVC system 120 includes a first adder 122, a plurality of haptic sensors 124, an estimator block 126, a generation block 128, an allocation block 130, and a plurality of haptic actuators and audio loudspeakers 132, and a second adder 134. The system 120 generally represents a high-level representation of the AVC system 120 that is arranged to minimize the effects of motion sickness on travelers (or passengers), which may be attributed to motion that is felt but not seen. Thus, the system 120 may cancel vibrations, or disturbances, at or near body parts (e.g., hands and feet) that include a large concentration of the cutaneous sensors 102, 104, 106, and 108 (see FIG. 1).

The plurality of haptic sensors 124 measure movement about a cabin of a moving vessel (e.g., airplane, vehicle, boat, etc.) which may be represented by a summed output of the first adder 122 (e.g., the sum of a reference signal x(t) and a disturbance signal d(t)). The reference signal x(t) generally corresponds to a system identification input signal (e.g., a Pseudo-Random-Binary-Sequences (PRBS) signal) which will be described in more detail in connection with FIG. 6. The disturbance signal d(t) represents vibrations inside a cabin around the travelers). The plurality of haptic sensors 124 measure moving cabin vibrations along vertical, longitudinal, and transverse directions, with respect to a traveler's position, using the haptic sensors with tactile feedback 124. The estimation block 126 uses appropriate reference input signals for system identification to estimate all the moving cabin resonant frequencies and their respective amplitudes, which are responsible for cabin vibrations. The generation block 128 generates anti-resonance waveforms and which may be applied to the haptic actuators 132 that are in close contact to the passenger's hands and/or feet. Prior to the haptic actuators 132 applying the anti-resonance waveforms, the allocation block 130 assigns vibrations with resonant frequencies that may be less than 50 Hz and relatively small amplitudes for application to the haptic actuators 132. This aspect will be discussed in more detail in connection with FIG. 6 below. For example, with the estimated resonant frequencies as provided by the estimator block 126, that may be less than 50 Hz, the haptic actuators 132 apply the anti-resonance waveforms to, for example, the Meissner's corpuscles 104 and the Merkel's disks 106 to target these mechanoreceptors which are closer to the surface of the skin 100.

For example, with the estimated resonant frequencies provided from the estimator block 126 that may be in the range of between 50 Hz and 500 Hz and relatively large amplitudes, the haptic actuators 132 may apply the anti-resonance waveforms to, for example, the mechanoreceptors 105 that are positioned deeper in the skin 100 such as the Pacinian corpuscles 102, the Ruffini endings 104, and/or the Krause end bulbs, the haptic actuators 132 may apply the anti-resonance waveforms with different signal characteristics. In particular, studies have shown that depth, diameter, and orientation of the mechanoreceptors 105 play key roles in determining the excitation signals. For example, Meissner's corpuscles 104 may be at a skin depth of 5 mm with a diameter of 4 μm and a perpendicular, or vertical, orientation with respect to the nerve 110. On the other hand, Pacinian corpuscles 102 are at a skin depth of 20 mm with a diameter of 10 μm and a parallel, or horizontal, orientation with respect to the nerve 110. Deeper and larger mechanoreceptors 105 may require higher amplitude signals to excite them effectively. For example, it is possible to generate virtual tactile sensitivity when applying an electrical signal to the skin 100 with excitation levels of at least 0.2 mA. Moreover, the polarity of the excitation signal is a function of orientation of the mechanoreceptors 105. Negative polarity of the input signal may excite horizontal receptors while positive polarity may excite vertical receptors. The allocation block 130 may assign vibrations with resonant frequencies larger than 500 Hz to the audio loudspeakers 132 to target both tactile and audible receptors with appropriate amplitudes. While not an actual physical component that is implemented in the system 120, the second adder 134 depicts the manner in which vibration cancellation is achieved and the disturbance d(t) at traveler receptors is minimized when applying the anti-resonance waveforms.

FIG. 3 is plot 200 illustrating frequency response ranges for human tactile and audible perception. In general, successful AVC from very low frequencies to about 1000 Hz may rely on both tactile and audible perceptions. In particular, human tactile and audible perceptions have different frequency ranges as illustrated in FIG. 3. While cutaneous sensors in the skin 100 respond to tactile stimuli in the lower frequency range from 2 Hz to 500 Hz, vestibular sensors in an inner ear of the passenger respond to sound stimuli in the mid to higher frequency range from 20 Hz to 20 KHz. Moreover, tactile sensors have varying frequency and amplitude responses depending on their skin depth location and the type of biological encapsulation as further illustrated in FIG. 3 between the Pacinian corpuscles 102 and the Meissner corpuscles 104.

Figure 4:
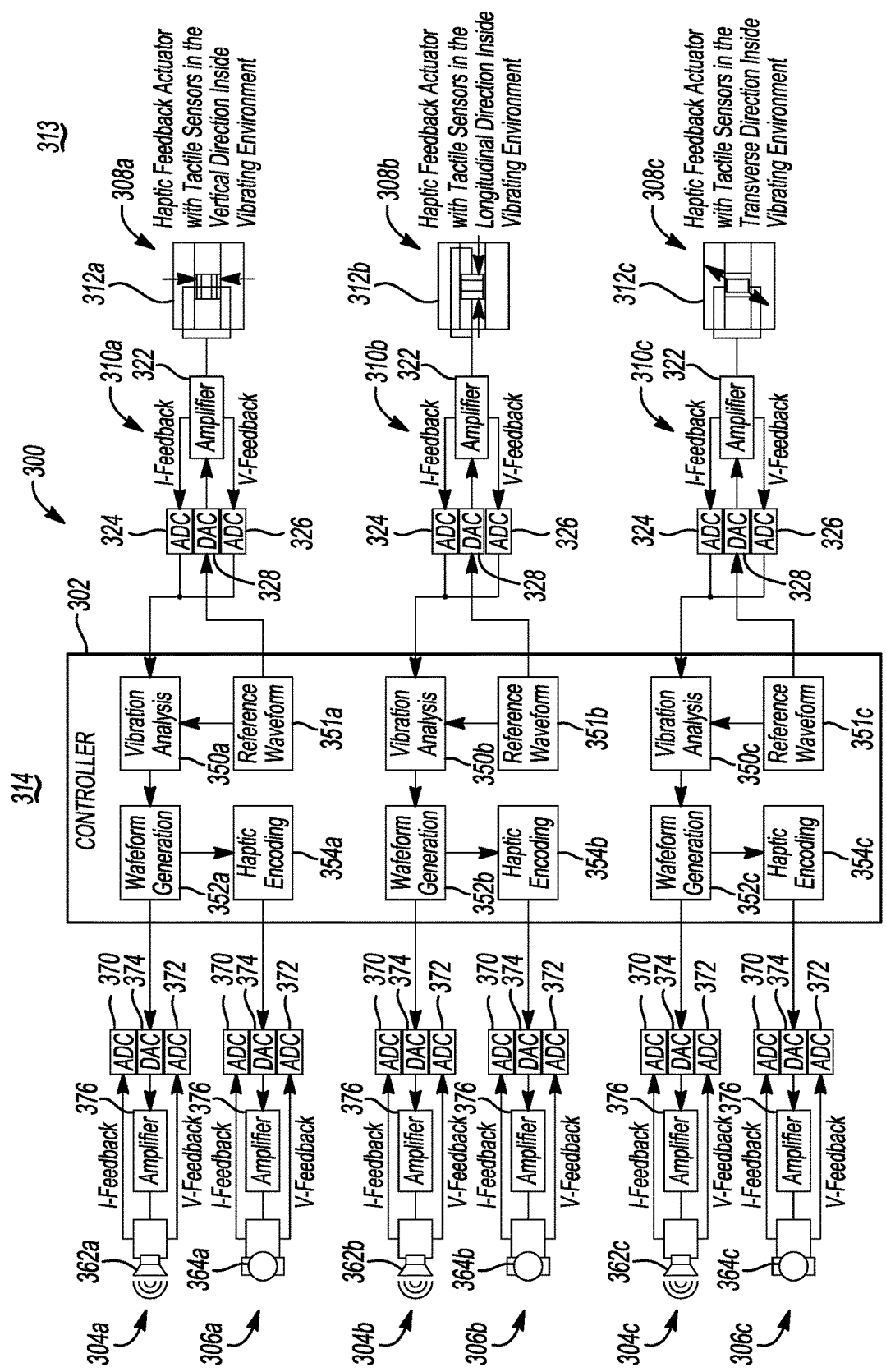
FIG. 4 depicts another AVC system that utilizes haptic feedback in accordance to one embodiment.

FIG. 4 depicts another AVC system 300 implemented in a cabin 313 of a moving vessel 314 (e.g., automotive vehicle, boat, airplane, train, etc.) that utilizes haptic feedback in accordance to one embodiment. The system 300 includes at least one controller 302 (hereafter "the controller 302"), a plurality of loudspeakers assemblies 304a-304c, a plurality of haptic actuator assemblies 306a-306c, and a plurality of haptic sensing assemblies 308a-308c. AVC which is generally defined as the cancellation of vibrations from low frequencies to about 1000 Hz may be achieved by the AVC system 300.

The plurality of haptic sensing assemblies 308a-308c measure cabin vibrations along a vertical, a longitudinal, and transverse directions, with respect to a traveler's position. The haptic sensing assemblies 308a-308c measure forces exerted on haptic interfaces either by users or the environment. This is achieved by monitoring the haptic sensor electrical feedback signals of voltage drop and current draw. Each of the haptic sensing assemblies 308a-308c includes a corresponding driver assembly 310a-310c and a haptic sensor 312a-312c. Each driver assembly 310a-310c includes the haptic sensor 312a-312c, respectively, an amplifier 322, a first analog to digital converter (ADC) 324, a second ADC 326, and a digital to analog (DAC) converter 328. Each haptic sensor 312a-312c may be implemented as a piezoelectric actuator or a linear resonant actuator (LRA). In one example, the haptic sensor 312a may include tactile sensors that are arranged in a vertical direction inside of the vibrating environment (or cabin 313) to measure resonant frequencies in the vertical direction with respect to the traveler's position. In another example, the haptic sensor 312b may include tactile sensors that are arranged in a horizontal direction inside of the vibrating environment (or cabin 313) to measure resonant frequencies in the horizontal direction with respect to the traveler's position. In another example, the haptic sensor 312c may include tactile sensors that are arranged in a transverse direction inside of the vibrating environment (or cabin 313) to measure resonant frequencies in the transverse direction with respect to the traveler's position.

Each haptic sensor 312 is coupled to the power amplifier 322. Similarly, the first ADC 324 and the second ADC 326 are coupled to a corresponding haptic actuator 312a-312c to convert an analog signal to a digital signal for transmission to the controller 302. The analog signal is generally indicative of the measured force exerted on the user or the environment within the cabin 313. The first ADC 324 and the second ADC 326 convert the analog signals that are received from the haptic sensors 312a-312c into digital signals for transmission to the controller 302. Prior to such conversion, the voltage across the haptic sensors 312a-312c changes as a result of the forces acting on the haptic sensors 312a-312c. The electrical impedance loads of the haptic sensors 312a-312c are fully characterized by the electrical currents being drawn from the amplifier 322 and the corresponding voltage drops across the haptic sensors 312a-312c. These analog electrical feedback signals of current and voltage are measured inside the amplifier 322 and converted into the digital domain via the first ADC 324 and the second ADC 326. The amplifier 322 obtains the current and voltage feedback by employing the following. For example, a bias voltage from the amplifier 322 is applied to the haptic sensors 312a-312c to induce an electrical impedance steady state that is indicative of at-rest conditions. Any force applied on one or more of the haptic sensors 312a-312c result in fluctuations of the steady-state impedance, also known as back electromotive force (EMF). In this case, there may be variations in the bias electrical current and/or voltage due to the forces which are measured via the feedback signals from the amplifier 322.

The controller 302 includes at least one digital signal processor (DSP). The controller 302 also includes vibration analysis blocks 350a-350c that are operably coupled to outputs of the first ADC 324 and the second ADC 326. The vibration analysis blocks 350a-350c analyzes the digitized electrical signals as received from the first ADC 324 and the second ADC 326 via the DSP to estimate various vibration parameters. For example, the vibration analysis blocks 350a-350c estimate resonant frequencies, amplitudes, and phases. The controller 302 also includes waveform generators 352a-352c that generate anti-resonance waveforms in response to signals from corresponding vibration analysis blocks 350a-350b. The waveform generators 352a-352c may drive transducers 362a-362c of the loudspeakers assemblies 304a-304c, respectively to generate the anti-wave resonance (or an anti-wave audio signal) to cancel a disturbing resonance that the user may be experiencing which may cause motion sickness. In general, each of the transducers 362a-362c may be positioned close to the user's ears and transmit an audio signal (that is not audible) to the user's ear. The anti-wave audio signal is generated at the resonance (or at a destructive resonant frequency that is out of phase to the resonant frequency that is experienced at the user's ear as a result of vibrations in the moving vessel 314) to mitigate the motion sickness. The controller 302 also includes reference waveform generators 351a-351c that generate and transmit reference input waveforms to the haptic sensors 312a-312c, respectively, via the DACs 328 and the amplifiers 328. This aspect will be discussed in more detail below.

The controller 302 also includes haptic encoders 354a-354c that encode the anti-resonance waveforms generated by the waveform generators 352a-352c. For example, the haptic encoders 354a-354a may encode the anti-resonance waveforms using modulation techniques such as pulse width modulation (PWM), random PWM, pulse duration coding (PDC), and pulse occurrence coding (POC), etc. The haptic generators 354a-354c may drive haptic actuators 364a-364c of the of the haptic actuator assemblies 306a-306c, respectively, to generate the anti-wave haptic signal to cancel the disturbing resonance that the user may be experiencing which may cause motion sickness. In general, each of the haptic actuators 364a-364c may be positioned at predefined areas in the cabin 313 such as at areas that are in contact with the user's hands and/or feet. In this case, the haptic actuators 364a-364c apply a haptic feedback to the user's hands and/or feet whereby the haptic feedback includes the anti-wave resonance to minimize or eliminate the motion sickness. The transducers 362a-362c may be positioned close to (or adjacent to) the user's ears and transmit an audio signal (that is not audible) to the user's ear. The anti-wave audio signal is generated at the resonance (or at a destructive resonant frequency that is out of phase to the resonant frequency that is experienced at the user's ear as a result of vibrations in the moving vessel 314) to mitigate motion sickness. The anti-wave signal that is used to drive the haptic actuators 364a-364c is also generated to be out of phase with the resonant frequency.

Each of the plurality of loudspeaker assemblies 304a-304c and the plurality of haptic actuator assemblies 306a-306c include a first ADC 370, a second ADC 372, a DAC 374, and an amplifier 376. The amplifier 376 drives the haptic actuators 364a-364c at the desired amplitude, frequency, and polarity. The first and second ADCs 370 and 372 monitor the feedback voltage and feedback current signals from the transducers 362a-362c and the haptic actuators 364a-364c to ensure that the transducers 362a-362c and the haptic actuators 364a-364c are operating at the correct amplitude, frequency, phase, and polarity.

Figure 5:
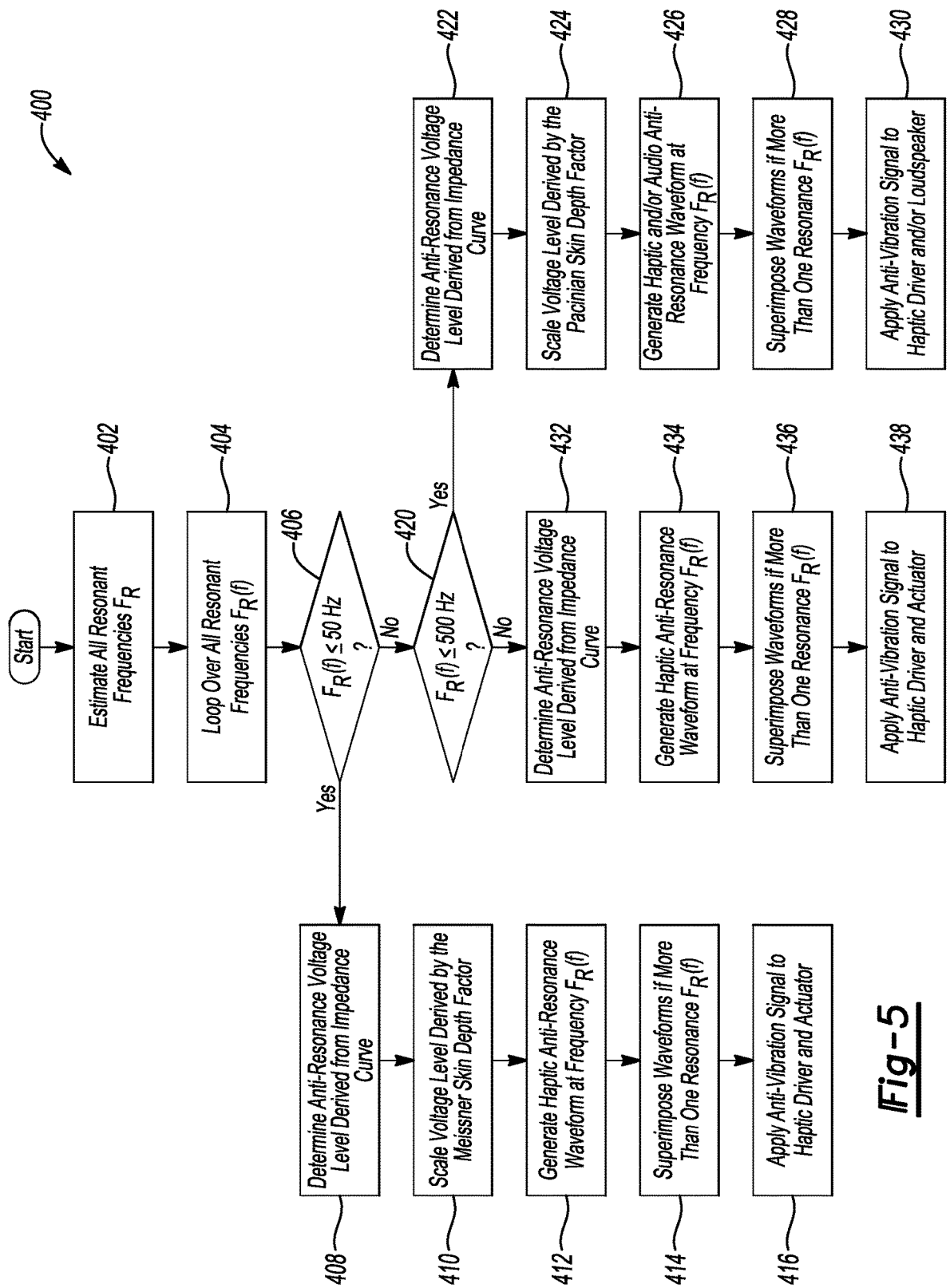
FIG. 5 depicts a method for performing anti-resonance waveform allocation to haptic actuators and audio transducers in accordance to one embodiment.

FIG. 5 depicts a method 400 for performing anti-resonance waveform allocation to the audio transducers 362a-362c and the haptic actuators 364a-364c in accordance to one embodiment.

In operation 402, the plurality of haptic sensing assemblies 308a-308c (e.g., the haptic sensors 312a-312c) measure cabin vibrations along a vertical, a longitudinal, and transverse directions, with respect to a traveler's position. The haptic sensing assemblies 308a-308c measure forces exerted on haptic interfaces that are experienced by the user's within the environment of the cabin 313. As noted above, the haptic sensor 312a may include a tactile sensor that is arranged in a vertical direction inside of the vibrating environment (or the cabin 313) to measure resonant frequencies in the vertical direction with respect to the traveler's position. In another example, the haptic sensor 312b may include a tactile sensor that is arranged in a horizontal direction inside of the vibrating environment (or the cabin 313) to measure resonant frequencies in the horizontal direction with respect to the traveler's position. In another example, the haptic sensor 312c may include tactile sensors that are arranged in a transverse direction inside of the vibrating environment (or the cabin 313) to measure resonant frequencies in the transverse direction with respect to the traveler's position. The haptic sensors 312a-312b provide the measured vibrations in the vertical, horizontal, and the transverse directions to the controller 302 to determine the resonant frequencies.

In operation 404, the controller 302 loops over all of the received measured vibrations in the vertical, horizontal, and the transverse directions to determine the resonant frequencies $F_R(f)$ in these noted directions.

In operation 406, the controller 302 determines whether one or more of the resonant frequencies $F_R(f)$ is below a first predetermined value (e.g., 50 Hz). If this condition is true, the method 400 proceeds to operation 408. If not, then the method 400 proceeds to operation 420.

In operation 408, the controller 302 determines a voltage level that corresponds to a desired resonant value to drive at least one or more of the haptic actuators 364a-364c. The voltage level is based on an impedance curve. The impedance curve is obtained by dividing the feedback voltage by the feedback current from the amplifiers 322, which results in resistance, and then transforming the result into the frequency domain. Peak values in the impedance curves larger than some threshold determine the resonance frequencies. The voltage level is determined by multiplying the magnitude of the impedance at the resonant frequency with the input current value, e.g. 0.2 mA of the reference waveform.

In operation 410, the controller 302 scales back the derived voltage level by a Meissner skin depth factor. The Meissner skin depth effect takes into account that the Meissner corpuscles 104 are smaller in diameter and shallower in depth. Therefore, given a reference input reference current value, for example 0.2 mA, the controller 302 may scale the derived voltage level by such a factor. For example, the controller 302 scales a signal that is transmitted to the at least one haptic actuator 364a-364c by a predetermined amount to account for a skin depth factor (e,g., the Meissner skin depth factor associated with the Meissner corpuscles 104 of the human anatomy). It is recognized that the controller 302 may either increase or decrease the derived voltage level to be applied to the corresponding mechanoreceptor 104 based on the position (or depth) within the skin 100 and/or overall size (e.g., diameter).

In operation 412, the controller 302 generates an anti-resonance waveform at a frequency $F_R(f)$.

In operation 414, the controller 302 superimposes waveforms (or adds the waveforms) if more than one resonance frequency $F_R(f)$ is required. For example, if the controller 302 determines that there are two or more measured resonant frequencies at one of the haptics sensors 312a-312c and each of such resonant frequencies are below the first predetermined value (e.g. see operation 406 above), then the controller 302 superimposes the multiple waveforms for the multiple number of resonance frequencies $F_R(f)$.

In operation 416, the controller 302 controls the amplifier 376 to apply the anti-resonance waveform (or anti-vibration signal) to the corresponding haptic actuator 364a, 364b, 364c.

In operation 420, the controller 302 determines whether one or more of the resonant frequencies $F_R(f)$ is below a second predetermined value (e.g., 500 Hz). If this condition is true, then the method 400 proceeds to operation 422. If not, then the method 400 proceeds to operation 432.

In operation 432, the controller 302 determines a voltage level that corresponds to a desired resonant value to drive at least one or more of the haptic actuators 364a-364c. The voltage level is based on an impedance curve. As noted above, the impedance curve is obtained by dividing the feedback voltage by the feedback current from the amplifiers 322, which results in resistance, and then transforming the result into the frequency domain. Peak values in the impedance curves larger than some threshold determine the resonance frequencies. The voltage level is determined by multiplying the magnitude of the impedance at the resonant frequency with the input current value, e.g. 0.2 mA of the reference waveform.

In operation 434, the controller 302 generates an anti-resonance waveform at a frequency $F_R(f)$ (e.g., 50<500 Hz).

In operation 436, the controller 302 superimposes waveforms (or adds the waveforms) if more than one resonance frequency $F_R(f)$ is required. For example, if the controller 302 determines that there are two or more measured resonant frequencies at one of the haptics sensors 312a-312c and each of such resonant frequencies are above the first predetermined value and below the second predetermined value, then the controller 302 superimposes the multiple waveforms for the multiple number of resonance frequencies $F_R(f)$.

In operation 438, the controller 302 controls the amplifier 376 to apply the anti-resonance waveform (or anti-vibration signal) to the corresponding haptic actuator 364a, 364b, 364c.

In operation 422, the controller 302 determines a voltage level that corresponds to a desired resonant value to drive at least one or more of the haptic actuators 364a-364c. The voltage level is based on an impedance curve. The impedance curve is obtained by dividing the feedback voltage by the feedback current from the amplifiers 322, which results in resistance, and then transforming the result into the frequency domain. Peak values in the impedance curves larger than some threshold determine the resonance frequencies. The voltage level is determined by multiplying the magnitude of the impedance at the resonant frequency with the input current value, e.g. 0.2 mA of the reference waveform.

In operation 424, the controller 302 scales back the derived voltage level by a Pacinian skin depth factor. The Pacinian skin depth effect takes into account the Pacinian corpuscles 102 that are smaller in diameter and shallower in depth. Therefore, given a reference input reference current value, for example 0.2 mA, the controller 302 may scale the derived voltage level by such a factor. For example, the controller 302 scales a signal that is transmitted to the at least one haptic actuator 364a-364c by a predetermined amount to account for a skin depth factor (e.g., the Pacinian skin depth factor associated with the Pacinian corpuscles 102 of the human anatomy). As noted above, it is recognized that the controller 302 may either increase or decrease the derived voltage level to be applied to the corresponding mechanoreceptor 104 based on the position (or depth) within the skin 100 and/or overall size (e.g., diameter).

In operation 426, the controller 302 generates an anti-resonance waveform at a frequency $F_R(f)$.

In operation 428, the controller 302 superimposes waveforms (or adds the waveforms) if more than one resonance frequency $F_R(f)$ is required. For example, the controller 302 determines that there are two or more measured resonant frequencies at one of the haptics sensors 312a-312c and each of such resonant frequencies are above the second predetermined value, then the controller 302 superimposes the multiple waveforms for the multiple number of resonance frequencies $F_R(f)$.

In operation 430, the controller 302 controls the amplifier 376 to apply the anti-resonance waveform (or anti-vibration signal) to the corresponding transducer 362a, 362b, 362c and to the corresponding actuator 364a-364c. In general, at border frequencies such as, for example, 500 Hz (or greater than 500 Hz), the controller 302 transmits the anti-wave signals (or anti-resonance waveforms) to both the transducers 362a-362c and the haptic actuators 364a-364b. It should be noted that in operation 434 and 436 as noted above, in the event the resonant frequency is determined to be set to some value that is close to, or equal to 500 Hz, then the controller 302 may also transmit the anti-wave signals to both the transducers 362a-362c and the haptic actuators 364a-364c.

Figure 6:
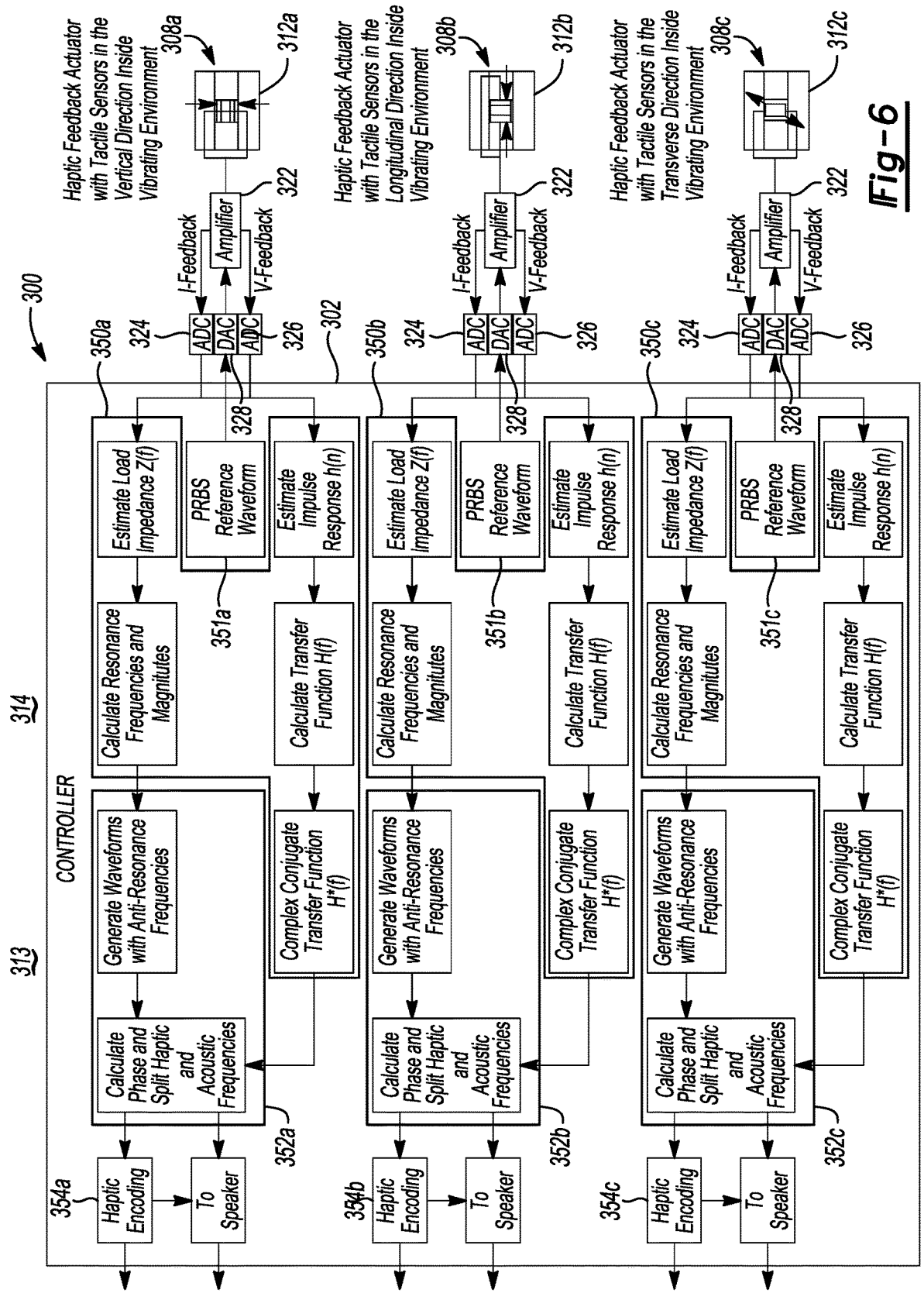
FIG. 6 depicts a more detailed implementation of the AVC system of FIG. 4 for performing vibration analysis and parameter estimation in accordance to one embodiment.

FIG. 6 depicts a more detailed implementation of the AVC system 300 for performing vibration analysis and parameter estimation in accordance to one embodiment. Vibration analysis as performed herein relies on estimating resonant frequencies, their magnitudes, and their phases. In order to obtain these estimates, proper input reference waveforms for system identification are needed such as, for example, sinusoidal signals, chirp signals, white noise signals, etc. The system 300 may rely on Pseudo-Random-Binary-Sequences (PRBS) signals. PRBS signals, also known as pseudo-noise (PN), linear feedback shift register (LFSR) sequences or maximal length binary sequences (MLBS). The PRBS signals may be random bit streams of '1's or '0's, which are periodic. This may be a desirable feature for system identification as this aspect enables the prediction of an incoming sequence and makes it possible to register and count errors that might occur in the sequence. Also, PRBS has similar wide-band spectral nature to white noise, which can stimulate various modes of the system to be identified in as wide frequency range as possible. Thus, high identification accuracy, coupled with strong practical performance, makes PRBS the optimal excitation signal.

PRBS exhibits a white noise like spectrum with very small magnitudes occurring at multiples of the PRBS clock sampling frequency, thus allowing for correlation techniques to be used for system identification and impulse response estimation. In particular, if a linear time invariant (LTI) system's impulse response is to be measured using a PRBS, the response can be extracted from the measured system output y[n] by taking its cross-correlation with the PRBS. This is because the autocorrelation of a PRBS is 1 for zero-lag, and nearly zero (−1/N where N is the sequence length) for all other lags; in other words, the autocorrelation of the PRBS can be said to approach unit impulse function as PRBS length increases.

If the impulse response of a system is h[n] and the PRBS input signal is s[n], then the system output y(n) is the convolution of h(n) and s(n):

$$y(n)=h(n)*s(n)$$

Taking the cross-correlation with respect to s(n) on both sides above yields, $$\phi_{sy}=h(n)*\phi_{ss}$$

and assuming that $\phi_{ss}$ is an impulse as discussed above, then $$h(n)=\phi_{sy}$$

Any signal with an impulsive autocorrelation can be used for this purpose, but signals with a high crest factor, such as the impulse function itself, produce impulse responses with poor signal-to-noise ratio. Due to its very low crest factor, PRBS may then be the ideal signal.

Using the analysis discussed above, the system 300 measures vibrations and estimates system parameters according to the block diagram as illustrated in FIG. 6. In general, the haptic sensors 312a-312c with tactile feedback may be placed in the cabin 313 on the moving vessel 314. The haptic sensors 312a-312c may be positioned in close proximity anywhere in the cabin 313. The haptic sensors 312a-312c may be positioned in close proximity to where travelers' hands and feet might be located. As noted above, the haptic sensors 312a-312c are grouped with one another to measure three-axial vibrations in vertical, longitudinal, and transverse planes with respect to travelers' bodies. The reference waveforms 351a-351c provide the reference input waveforms as a PRBS signal which are amplified via the amplifiers 322 and later transmitted to the haptic sensors 312a-312c. The controller 302 receives feedback electrical voltage and current captured from the amplifiers 322 (e.g., from the haptic sensor 312a-312c) and digitized by the first and the second ADCs 324, 326.

The controller 302 performs the following calculations for the haptic sensor 312a-312c for each vibratory axial direction:

1) The vibration analysis block 350a-350c of the controller 302 determines the Impulse response, h(n), and transfer function, H(f), estimation: Given the digital input reference PRBS voltage signal, $V_{in}(n)$, and the measured feedback voltage signal from the amplifiers 322, $V_{out}(n)$, the system transfer function, H(f) may be calculated as follows:

$$H(f)=\text{DFT}[h(n)]=\text{DFT}[x\text{ corr}(V_{in}(n),V_{out}(n))] \quad \text{(Eq. 1)}$$

where DFT is the discrete Fourier transform and xcorr is the cross-correlation function.

2) The controller 302 determines the phase function of the transfer function, H(f) as follows:

$$\text{Phase}(H(f))=\Phi_R(f)=\arctan\left(\frac{\text{Imaginary}(H(f))}{\text{Real}(H(f))}\right) \quad \text{(Eq. 2)}$$

where arctan is the arctangent, or inverse tangent, operator.

3) The controller 302 (i.e., the vibration analysis block 350a-350c) applies the complex conjugate operator on a phase function in order to obtain anti-phase values as a function of frequency:

$$\Phi^*_R(f)=\text{complex\_conjugate}\{\Phi_R(f)\} \quad \text{(Eq. 3)}$$

4) The controller 302 (i.e., the vibration analysis block 350a-350c) determines the impedances, resonant frequencies, and resonant magnitudes estimation based on the following:

a. Given the digital input reference PRBS voltage signal from the reference waveform block 351a-351c, $V_{in}(n)$, the measured feedback voltage signal from the amplifier, $V_{out}(n)$, and the measured feedback current signal from the amplifier, $I_{out}(n)$, then the system impedance, Z(f), is calculated as follows:

$$Z(f)=\frac{\text{DFT}[V_{out}(n)]}{\text{DFT}[I_{out}(n)]}=R+jX \quad \text{(Eq. 4)}$$

where DFT is the discrete Fourier transform and j is the complex number $\sqrt{-1}$.

5) Inspection of impedance magnitudes, |Z(f)|, allows the identification of the resonant frequencies, $F_R(f)$. In particular, frequencies with peak impedance magnitudes, $|Z_R(f)|$, above certain thresholds, $T_{mag}(f)$, are classified as resonant frequencies.

6) The waveform generation blocks 352a-352c generate the anti-resonance waveforms (or anti-wave signals) as follows: given the estimated M number of resonant frequencies, $F_R(f)$, their respective impedance magnitudes, $|Z_R(f)|$, and their respective phases, $\Phi^*_R(f)$, the waveform generation blocks 352a-352c generate a digital anti-resonance signal, $S_{AR}(n)$, as the summation of various sinusoids:

$$S_{AR}(n)=\Sigma_{i=1}^M|Z_R(i)|\cos(2\pi nF_R(i)+\Phi^*_R(i)) \quad \text{(Eq. 6)}$$

7) The controller 302 splits $S_{AR}(n)$ is into three different signals targeting haptic actuators 364a, 364b, 364c or shallow-skin receptors, haptic actuator for deep-skin receptors, and the transducers 362a, 362b, 362c for vestibular receptors.

In general, the controller 302 (i) estimates the load impedance of the resonant frequency detected by the haptic sensors 312a-312c, (ii) estimates a transfer function response to the determine phase/angle, and (iii) inverts the determined phase/angle such that the controller 302 applies the inverted resonant frequency to the haptic actuators 364a-364c to cancel the frequencies applied to the cabin 313.

Figure 7:
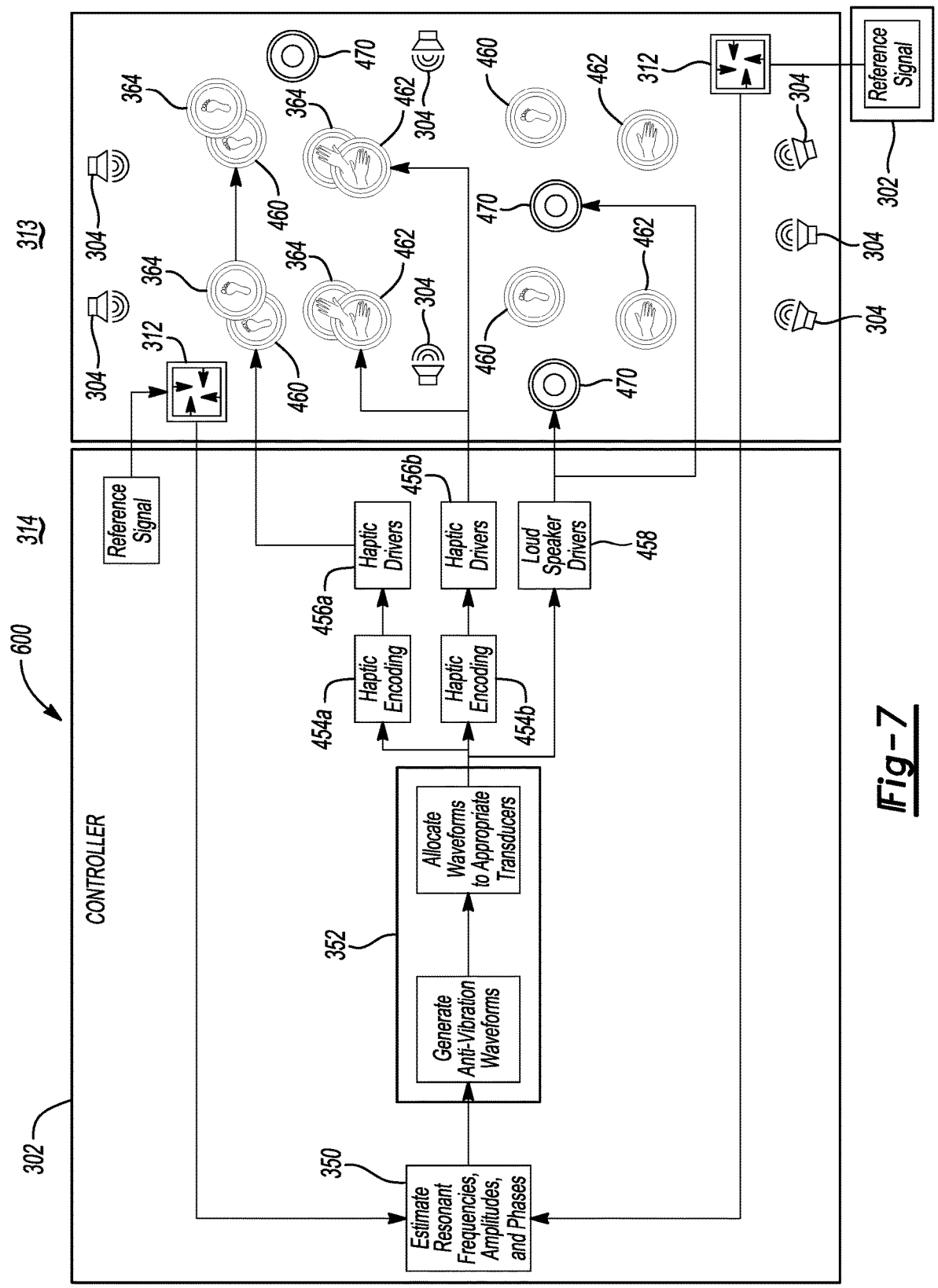
FIG. 7 depicts another AVC system that is positioned in a vehicle in accordance to one embodiment.

FIG. 7 depicts another AVC system 600 that is positioned in the cabin 313 of the moving vessel 314 in accordance to one embodiment. In general, the system 600 includes the controller 302, the plurality of loudspeaker assemblies 304a-304c ("304"), the plurality of haptic actuator assemblies 306a-306c ("306"), and the plurality of haptic sensors 312a-312c ("312"). In particular, the haptic actuators 364 are positioned in predetermined areas of the cabin 313. For example, one or more of the haptic actuators 364 may be positioned near the feet of the various passengers in the cabin 313. In this case, the controller 302 controls such haptic actuators 364 to apply to apply the anti-resonance waveform to the mechanoreceptors 105 positioned on feet 460 of the users to mitigate motion sickness. Additionally, one or more of the haptic actuators 364 may be positioned near the hands 462 of the various passengers in the cabin 313. In this case, the controller 302 controls such haptic actuators 364 to apply the anti-resonance waveform to the mechanoreceptors 105 positioned on the hands 462 of the users to mitigate motion sickness.

The controller 302 may also control one or more woofers 470 or subwoofers 472 of the corresponding loudspeaker assembly 304 to generate audio with the anti-resonance waveform to passenger's ears in the cabin 313. It is recognized that the frequency of the transmitted audio (or of the anti-resonance waveform) is higher than the frequency of the anti-resonance waveform that is used to drive the haptic actuators 364. The woofers 470 and/or the subwoofers 472 may be positioned in the cabin 313 to be in close proximity to the passengers. The haptic drivers 456a and 456b generally correspond to the amplifiers 376 of the plurality of haptic actuator assemblies 306 as illustrated in connection with FIG. 4. Similarly, the loudspeaker drivers 458 generally correspond to the amplifiers 376 as of the plurality of loudspeaker assemblies 304 as illustrated in connection with FIG. 4.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active vibration cancellation (AVC) system comprising:
at least one haptic sensing assembly positioned in a cabin of a moving vessel and being configured to transmit a first signal indicative of vibrations that are exhibited on at least one passenger in the cabin; and
at least one controller programmed to:
determine a resonant frequency of the vibrations that are exhibited on the at least one passenger in response to the first signal;
determine that the resonant frequency is less than a first predetermined value;
generate a first anti-wave signal in response to the resonant frequency being less than the first predetermined value; and
drive at least one haptic actuator that is positioned proximate to the at least one passenger in the cabin with the first anti-wave signal to minimize motion sickness for the at least one passenger caused by the vibrations that are exhibited on the at least one passenger in the vessel.

2. The AVC system of claim 1, wherein the at least one haptic actuator is positioned on the vessel and proximate to at least one of hands and feet of the at least one passenger to apply the first anti-wave signal thereto.

3. The AVC system of claim 1, wherein the first anti-wave signal includes a destructive resonant frequency that is out of phase with the resonant frequency of the vibrations that are exhibited on the at least one passenger.

4. The AVC system of claim 1, wherein the at least one controller is further programmed to adjust a signal that drives the at least one haptic actuator by a predetermined amount to account for a skin depth factor associated with one or more mechanoreceptors of a human anatomy.

5. The AVC system of claim 1, wherein the at least one controller is further programmed to determine a voltage level that corresponds to a desired resonant value to drive at the at least one haptic actuator.

6. The AVC system of claim 5, wherein the voltage level is based on an impedance curve.

7. The AVC system of claim 6 further comprising an amplifier that is operably coupled to the at least one haptic sensing assembly and being configured to receive a feedback current and a feedback voltage from the at least one haptic sensing assembly and being further configured to determine the impedance curve based on the feedback current and the feedback voltage.

8. The AVC system of claim 1, wherein the at least one controller is further programmed to compare the resonant frequency of the vibrations that are exhibited on the at least one passenger to a second predetermined value in the event the resonant frequency is greater than the first predetermined value.

9. The AVC system of claim 8, wherein the at least one controller is further programmed to generate a second anti-wave signal based on the comparison of the resonant frequency to the second predetermined value.

10. The AVC system of claim 9, wherein the at least one controller is further programmed to drive the at least one haptic actuator or at least one transducer that is positioned proximate to the at least one passenger in the cabin with the second anti-wave signal to minimize the motion sickness for the at least one passenger.

11. A computer-program product embodied in a non-transitory computer readable medium that is executable by at least one controller for performing active vibration cancellation (AVC) in a moving vessel, the computer-program product comprising instructions to:
receive a first signal indicative of vibrations that are exhibited on at least one passenger in a cabin of the moving vessel;
determine a resonant frequency of the vibrations that are exhibited on the at least one passenger based on the first signal;

generate a first anti-wave signal based on the resonant frequency; and drive at least one haptic actuator that is positioned proximate to the at least one passenger in the cabin with the first anti-wave signal to minimize motion sickness for the at least one passenger caused by the vibrations that are exhibited on the at least one passenger in the vessel.

12. The computer-program product of claim 11 further comprising instructions to drive the at least one haptic actuator that is positioned proximate to at least one of hands and feet of the at least one passenger to apply the first anti-wave signal thereto.

13. The computer-program product of claim 11, wherein the first anti-wave signal includes a destructive resonant frequency that is out of phase with the resonant frequency of the vibrations that are exhibited on the at least one passenger.

14. The computer-program product of claim 11 further comprising instructions to adjust a signal that drives the at least one haptic actuator by a predetermined amount to account for a skin depth factor associated with one or more mechanoreceptors of a human anatomy.

15. The computer-program product of claim 11 further comprising instructions to determine a voltage level that corresponds to a desired resonant value to drive at the at least one haptic actuator.

16. The computer-program product of claim 15, wherein the voltage level is based on an impedance curve.

17. The computer-program product of claim 16 further comprising instructions to receive a feedback current and a feedback voltage from the at least one haptic sensing assembly and determining the impedance curve based on the feedback current and the feedback voltage.

18. A method for performing active vibration cancellation (AVC) in a moving vessel, the method comprising:

receiving a first signal indicative of vibrations that are exhibited on at least one passenger in a cabin of the moving vessel;

determining a resonant frequency of the vibrations that are exhibited on the at least one passenger based on the first signal;

generating a first anti-wave signal based on the resonant frequency; and driving at least one haptic actuator that is positioned proximate to the at least one passenger in the cabin with the first anti-wave signal to minimize motion sickness for the at least one passenger caused by the vibrations that are exhibited on the at least one passenger in the vessel.

19. The method of claim 18 wherein driving the at least one haptic actuator includes driving the at least one haptic actuator that is positioned proximate to at least one of hands and feet of the at least one passenger to apply the first anti-wave signal thereto.

20. The method of claim 19, wherein the first anti-wave signal corresponds to a destructive resonant frequency that is out of phase with the resonant frequency of the vibrations that are exhibited on the at least one passenger.

* * * * *